United States Patent [19]

Fujii et al.

[11] Patent Number: 4,491,104
[45] Date of Patent: Jan. 1, 1985

[54] TORCH IGNITION TYPE INTERNAL COMBUSTION ENGINE

[75] Inventors: Isao Fujii; Hiroyuki Nishimura; Masaaki Kato, all of Saitama, Japan

[73] Assignee: Honda Giken Kogyo Kabushiki Kaisha, Tokyo, Japan

[21] Appl. No.: 398,100

[22] Filed: Jul. 14, 1982

[30] Foreign Application Priority Data

Apr. 17, 1982 [JP] Japan ................... 57-64604

[51] Int. Cl.³ ............................................. F02B 19/18
[52] U.S. Cl. ..................... 123/291; 123/293; 123/432; 123/661
[58] Field of Search .............. 123/286, 293, 291, 432, 123/661, 289

[56] References Cited

U.S. PATENT DOCUMENTS

| 2,173,081 | 9/1939 | Barkeij | 123/275 |
| 3,270,721 | 9/1966 | Hideg et al. | 123/286 |
| 4,004,563 | 1/1977 | Nakamura et al. | 123/287 |
| 4,092,969 | 6/1978 | Ono et al. | 123/287 |
| 4,098,246 | 7/1978 | Noguchi et al. | 123/260 |
| 4,127,089 | 11/1978 | Tsutsumi | 123/255 |
| 4,170,968 | 10/1979 | Noguchi et al. | 123/260 |
| 4,175,532 | 11/1979 | Kato | 123/287 |
| 4,182,287 | 1/1980 | Yagi et al. | 123/260 |
| 4,183,343 | 1/1980 | Tanahashi et al. | 123/260 |
| 4,216,748 | 8/1980 | Ichida | 123/432 |
| 4,317,438 | 3/1982 | Yagi et al. | 123/432 |

FOREIGN PATENT DOCUMENTS

| 54-38423 | 3/1979 | Japan | 123/286 |
| 595529 | 2/1978 | U.S.S.R. | 123/286 |

Primary Examiner—Andrew M. Dolinar
Attorney, Agent, or Firm—Lyon & Lyon

[57] ABSTRACT

A torch ignition type internal combustion engine has an auxiliary combustion chamber connected by a torch passage to a compact main combustion chamber. A cavity in the cylinder head forming a part of the main combustion chamber is provided with two intake valves on one side of the cavity and one exhaust valve on the other side. A large squish area is formed between the upper surface of the piston and the lower surface of the cylinder head and one or more suction conduits connect this squish area to the torch passage between its ends. Two torch passages may be provided; one may extend into the cavity near the exhaust valve and the other into the cavity near the remote intake valve. A plug chamber receives the spark plug electrodes and this chamber is in communication with both the auxiliary combustion chamber and the torch passage. In one form of the invention one torch passage extends from the lower end of the auxiliary combustion chamber and the other torch passage extends from the plug chamber.

9 Claims, 29 Drawing Figures

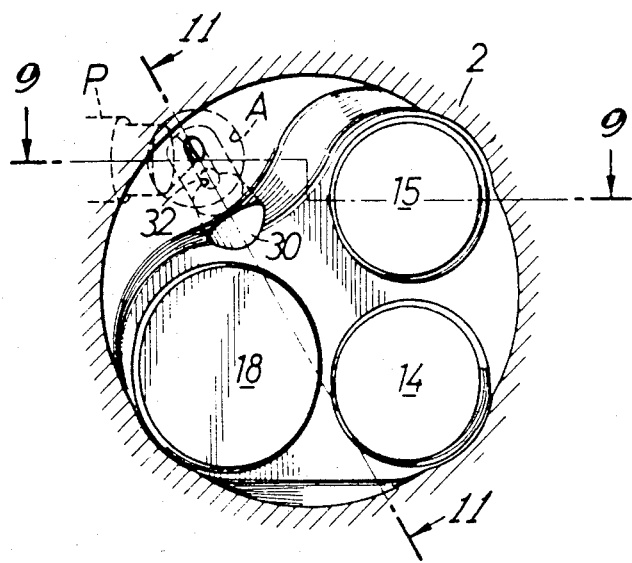
FIG. 10.
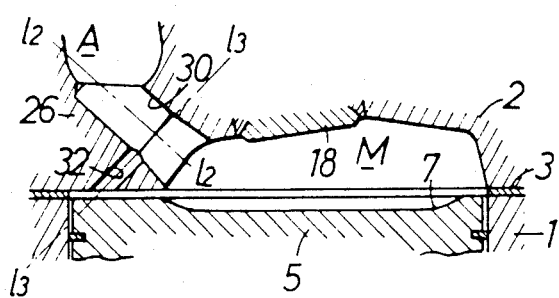
FIG. 12.
FIG. 11.
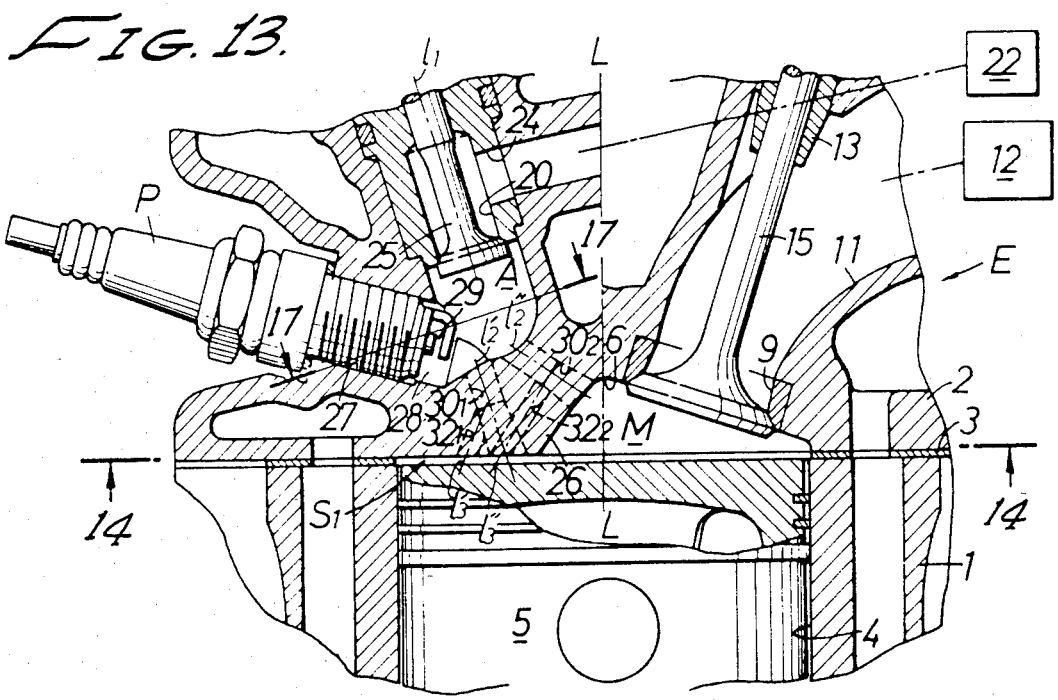
FIG. 13.

TORCH IGNITION TYPE INTERNAL COMBUSTION ENGINE

This invention relates to internal combustion piston engines of the torch ignition type in which a main combustion chamber receives a relatively lean mixture and an auxiliary combustion chamber receives a relatively rich mixture.

A torch passage connects the two combustion chambers. A spark plug ignites the mixture in the auxiliary combustion chamber at or near the end of the compression stroke, and the burning mixture is projected through the torch passage to ignite the relatively lean mixture in the main combustion chamber. Engines of this general type have been widely used in automobiles in recent years in order to reduce the pollutants HC, CO and $NO_x$ in the exhaust gases.

In recent years, requirements for protection of the environment and requirements for economy of operation have led to research and development to produce the optimum shape and configuration of elements employed in the combustion process. It is an object to develop a highly efficient internal combustion engine with torch ignition, which has its power output enhanced in addition to the reduction in the amount of noxious emissions and in addition to the improvement in fuel economy.

In the field of internal combustion engines, it is generally known that raising the compression ratio of the engine is effective for enhancing its thermal efficiency and thereby improving the power output and fuel economy. However, such raising of the compression ratio causes the knocking phenomenon (i.e., an abnormal combustion of the air-fuel mixture) to occur more often, thus adversely affecting the power output and imposing a limit on the raising of the compression ratio.

The knocking phenomenon is generally thought to be caused by a very abrupt combustion of the final burning portion, that is, of the end gas due to flame propagation in the air-fuel mixture. There are known measures for restraining such knocking, listed below by way of example:

(1) Reducing the temperature and pressure of the combustion gas;
(2) Promoting the cooling process of the walls of the combustion chamber, especially the end gas portion;
(3) Increasing the flame speed to accelerate the combustion speed;
(4) Shortening the propagation distance of the torch flame.

It is also known that the torch ignition type internal combustion piston engine has an excellent anti-knock characteristic.

In the torch ignition type internal combustion engine the means which has been generally taken for restraining occurrence of knocking includes increasing the speed of the torch flame to enable the torch flame to reach the end portion of the main combustion chamber, and to increase the combustion speed of the air-fuel mixture in the main combustion chamber as a whole. However, even in such a torch ignition type engine, if the compression ratio is raised, it becomes very difficult to restrain occurrence of knocking, with the result that there is a reduction in the engine power output, as is the case of a conventional type engine.

In addition, if torch energy or torch flame speed is markedly increased in the torch ignition type internal combustion engine, combustion noises sometimes occur, which are different from knocking, during particular operations of the engine, for example, in the range of low speed, heavy load operations. Occurrence of such combustion noises indicates no disadvantageous influence on the engine performances.

It is therefore a primary object of the present invention to provide a torch ignition type internal combustion piston engine having high performance, in which the compression ratio is increased, while restraining the knocking but retaining the favorable characteristics by adding to the engine constructional improvements which reduce the emission of noxious components such as HC, CO and $NO_x$ and which improve the fuel economy and the output performance.

Another object of the present invention is to provide a highly efficient torch ignition type internal combustion piston engine which runs quietly, lightly and smoothly by reduction of combustion noises. The compression ratio may be 10, or greater.

In accordance with the present invention, the above objects are accomplished by producing:

(1) Torch effect due to the burned gas;
(2) Effect of shortening the combustion time; and
(3) Cooling effect of the walls by the end gas.

Other objects and advantages will appear hereinafter.

IN THE DRAWINGS

FIGS. 9-12 show another modification. FIG. 9 is a view similar to FIG. 1.

FIG. 10 is a view taken substantially on line 10—10 as shown on FIG. 9.

FIG. 11 is a sectional detail taken substantially on line 11—11 as shown on FIG. 10.

FIG. 12 is a sectional detail taken substantially on line 12—12 as shown on FIG. 9.

FIGS. 13-17 show another modification of this invention. FIG. 13 is a view taken substantially on line 13—13 as shown on FIG. 14.

FIG. 14 is a view taken substantially on line 14—14 as shown on FIG. 13.

FIG. 15 is a view taken substantially on line 15—15 as shown on FIG. 14.

FIG. 16 is a view taken substantially on line 16—16 as shown on FIG. 14.

FIG. 17 is a sectional detail taken substantially on line 17—17 as shown on FIG. 13.

Figure 18:
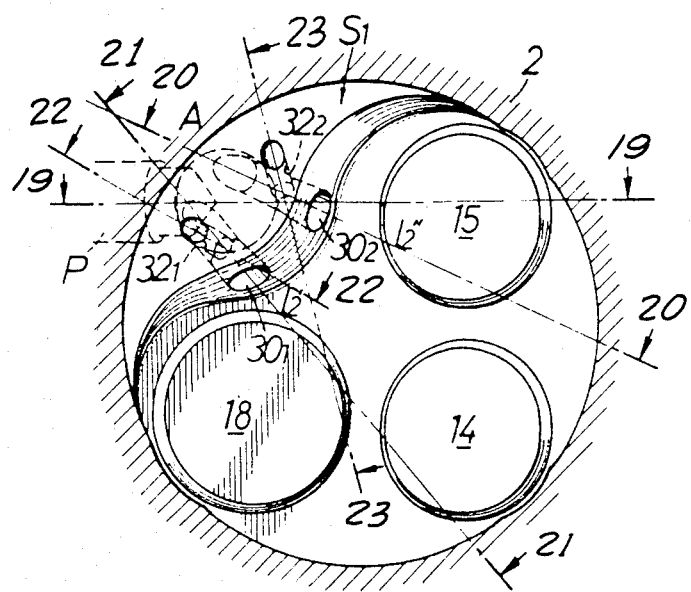

Another embodiment of this invention is shown in FIGS. 18-24. FIG. 18 is a view taken substantially on line 18—18 as shown on FIG. 19.

Figure 19:
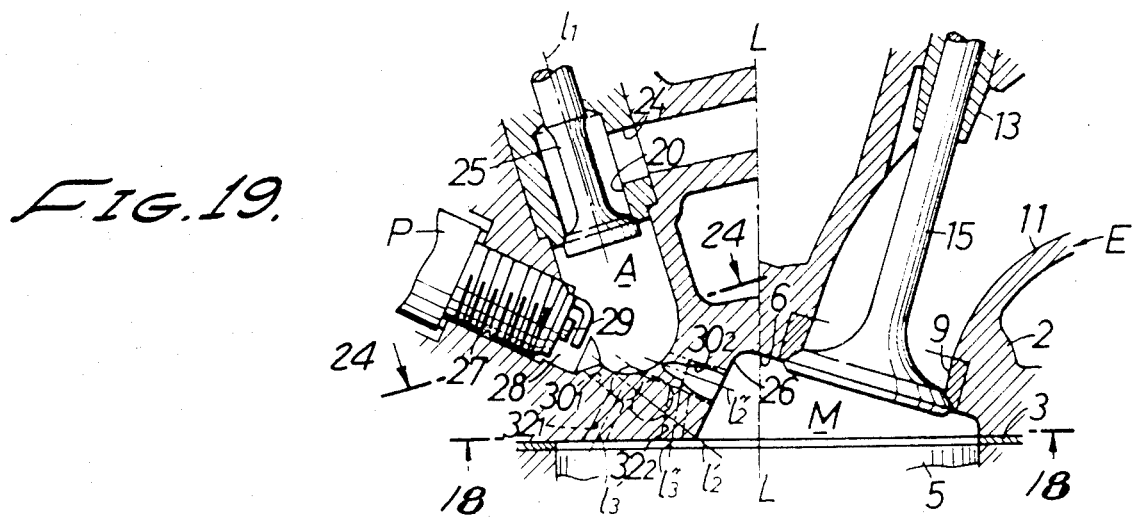

FIG. 19 is a sectional view taken substantially on line 19—19 as shown on FIG. 18.

Figure 20:
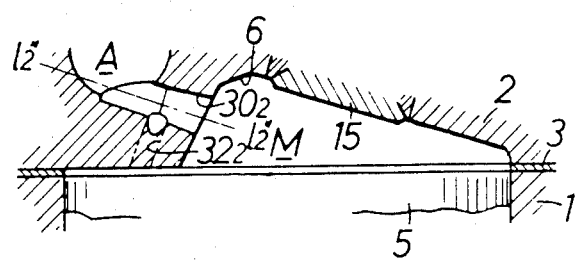

FIG. 20 is a sectional view taken substantially on line 20—20 as shown on FIG. 18.

Figure 21:
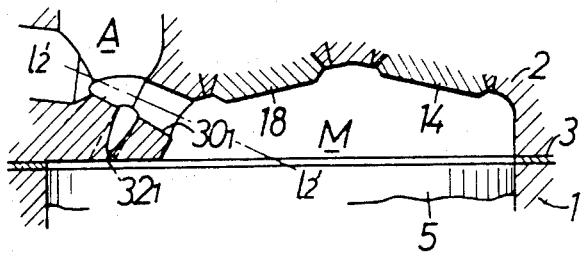

FIG. 21 is a sectional detail taken substantially on line 21—21 as shown on FIG. 18.

Figure 22:
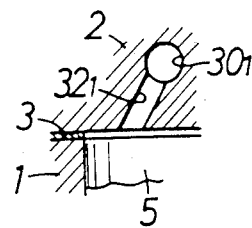

FIG. 22 is a sectional detail taken substantially on line 22—22 as shown on FIG. 18.

Figure 23:
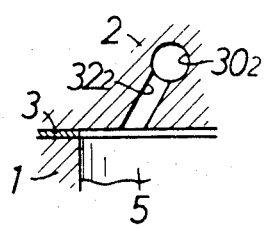

FIG. 23 is a sectional detail taken substantially on line 23—23 as shown on FIG. 18.

Figure 24:
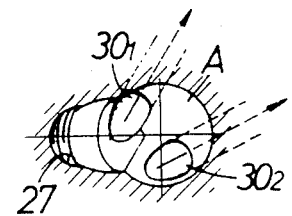

FIG. 24 is a sectional detail taken substantially on line 24—24 as shown on FIG. 19.

Figure 25:
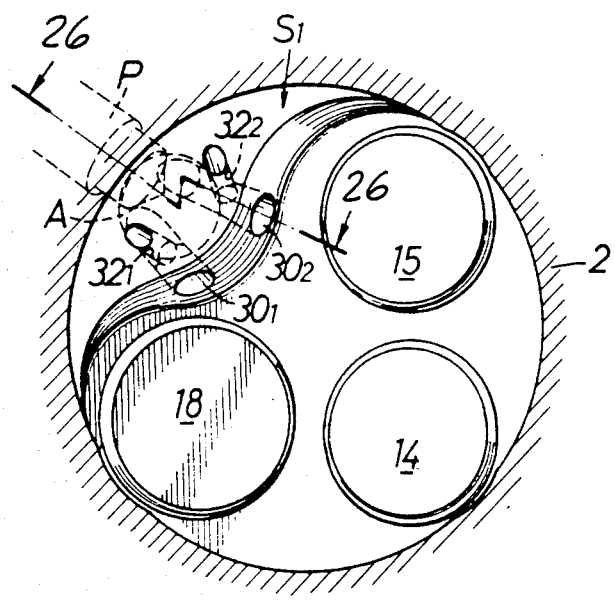

FIGS. 25-29 show another embodiment of this invention. FIG. 25 is a view similar to FIG. 18.

Figure 26:
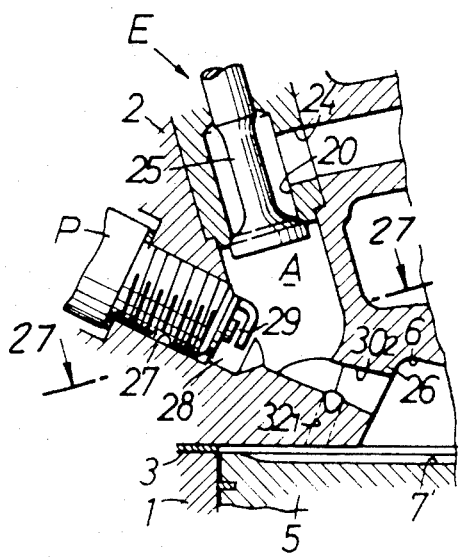

FIG. 26 is a sectional elevation taken substantially on line 26—26 as shown on FIG. 25.

Figure 27:
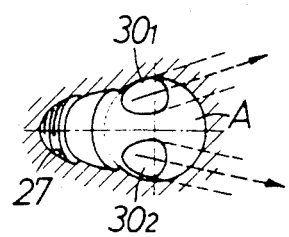

FIG. 27 is a sectional detail taken substantially on line 27—27 as shown on FIG. 26.

Figure 28:
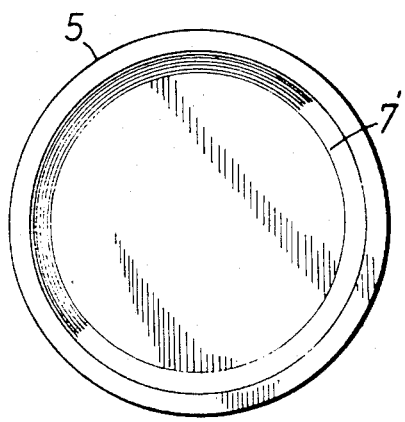

FIG. 28 is a top view of the piston shown in FIG. 26.

Figure 29:
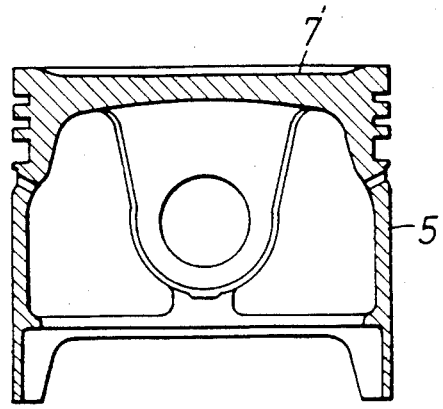

FIG. 29 is a sectional side elevation of the piston shown in FIG. 28.

Referring to the drawings, the preferred form of the invention shown in FIGS. 1-6 has an engine E which includes a cylinder block 1 and a cylinder head 2 having flat mating faces secured together with a gasket 3 therebetween. The cylinder 4 in the engine block 1 has a piston 5 which reciprocates therein A cavity 6 in the cylinder head 2 cooperates with the piston 5 and its recess 7 to form the main combustion chamber M of relatively small volume.

At one side of the cavity 6 are first and second main intake valve openings 8 and 9, which communicate respectively with the first and second main intake ports 10 and 11 formed in the cylinder head 2. These main intake ports 10 and 11 receive a relatively lean air-fuel mixture from a first carburetor 12. The first and second main intake valve openings 8 and 9 are opened and closed by first and second main intake valves 14 and 15, respectively, which are slidably mounted by means of valve guides 13 in the cylinder head 2. The valves 14 and 15 are operated by conventional valve actuating mechanism.

Figure 2:
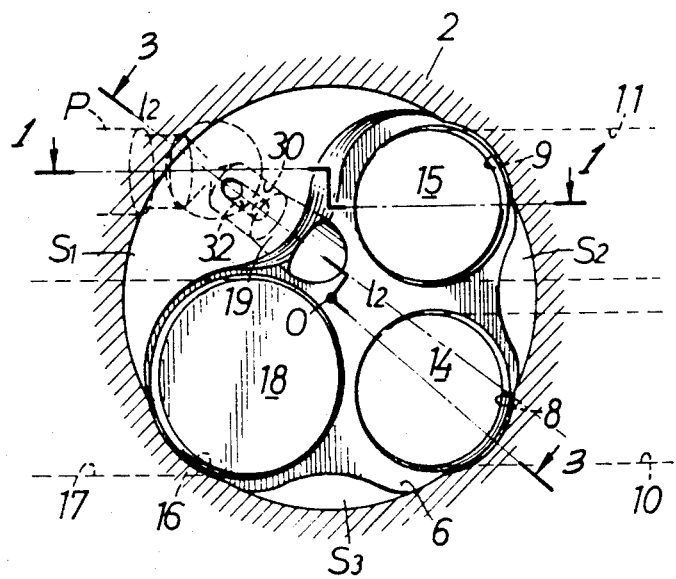
FIG. 2 is a transverse sectional view taken substantially on line 2—2 as shown on FIG. 1.
Figure 3:
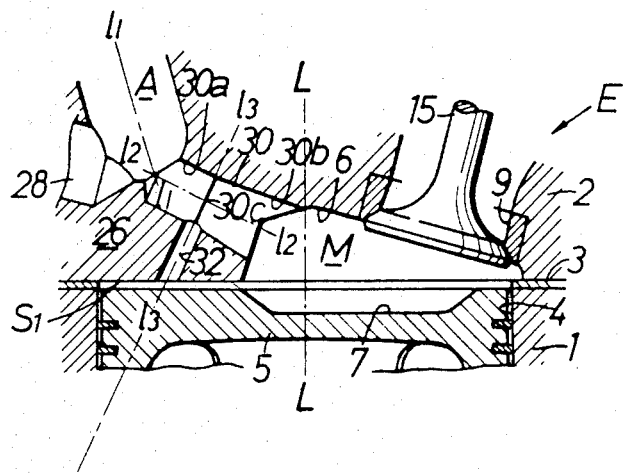
FIG. 3 is a sectional elevation partly broken away, taken substantially on line 3—3 as shown on FIG. 2.
Figure 4:
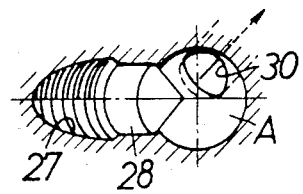
FIG. 4 is a sectional detail taken substantially on line 4—4 as shown on FIG. 1.
Figure 5:
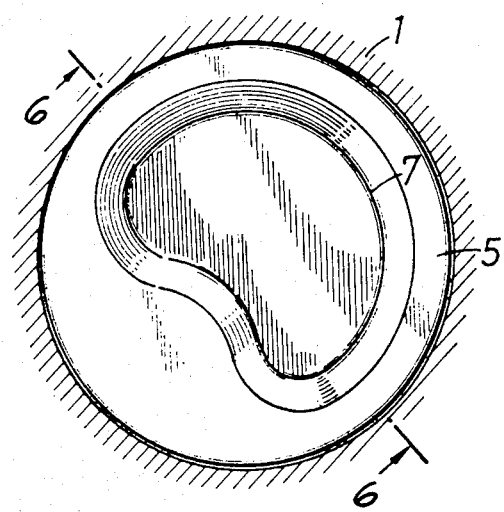
FIG. 5 is a plan view partly in section, taken substantially on line 5—5 as shown on FIG. 1.
Figure 6:
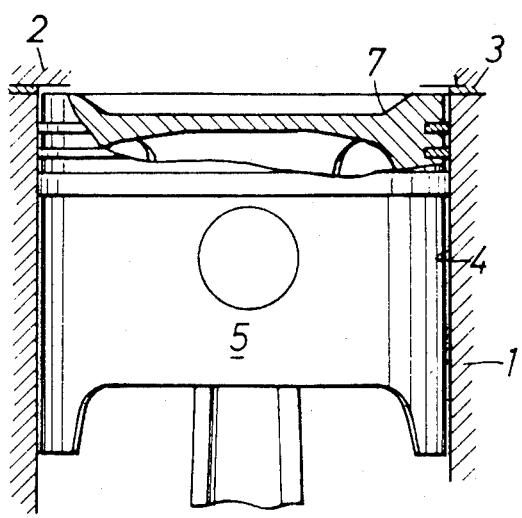
FIG. 6 is a sectional elevation taken substantially on line 6—6 as shown on FIG. 5.

As best shown in FIG. 2, the main combustion chamber M has at the other side thereof an exhaust valve opening 16 which communicates with an exhaust port 17 formed in the cylinder head 2 and is opened and closed by exhaust valve 18. It will be understood from FIG. 2 that the second main intake valve 15 and the exhaust valve 18 are arranged substantially on a diameter line of the cylinder 4 with the axial center 0 of the cylinder 4 between them. The first main intake valve 14 is positioned between the second main intake valve 15 and the exhaust valve 18, and at a position remote from the axial center 0 of the cylinder 4.

Figure 1:
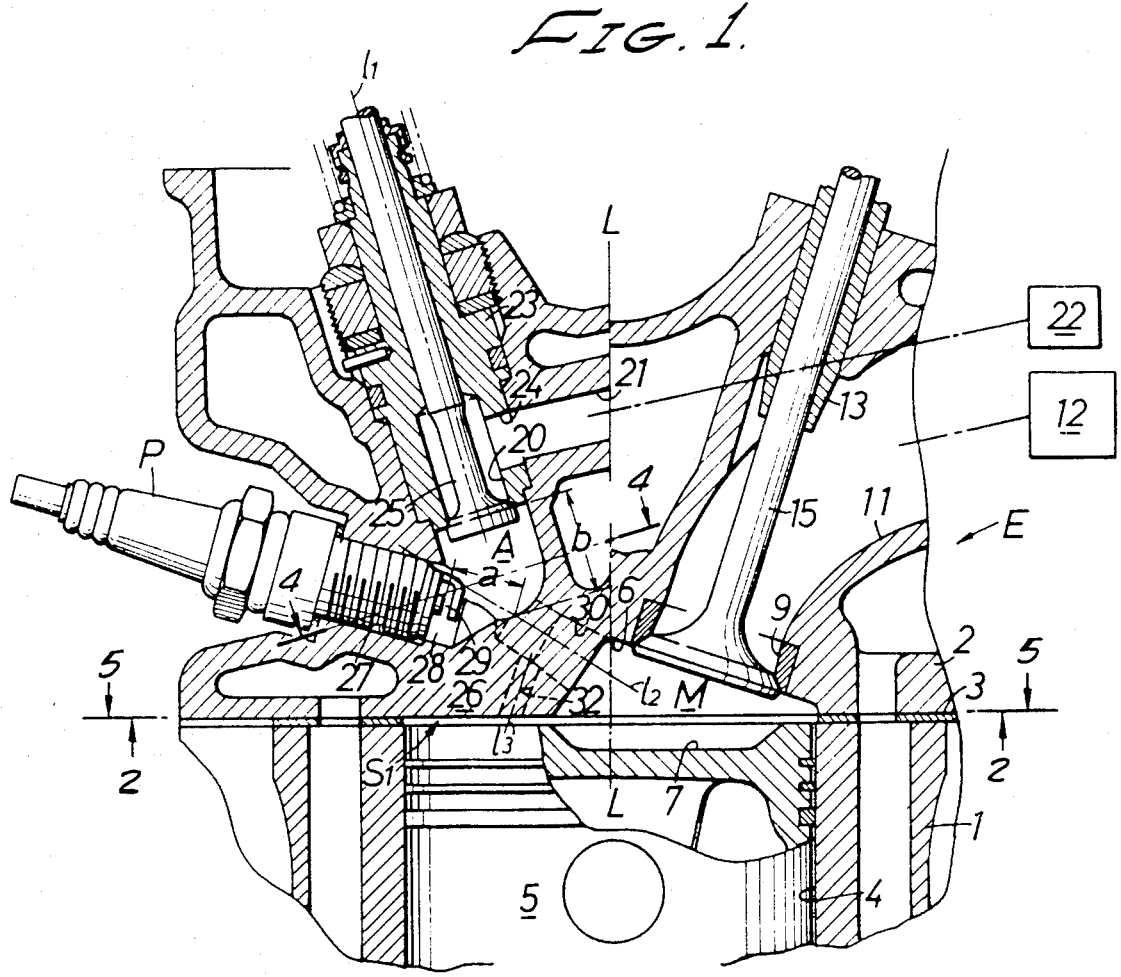
FIG. 1 is a sectional elevation showing a preferred embodiment of this invention, the section being taken on line 1—1 as shown on FIG. 2.

When the piston 5 is at its upper deadcenter position as shown in FIG. 1, there are formed at the outer peripheral portions of the main combustion chamber M a first large squish area $S_1$, and second and third small squish areas $S_2$ and $S_3$. These squish areas are formed by cooperation of the flat surface on the upper face of the piston 5 (excluding the recess 7) and the flat surfaces formed on the bottom face of the cylinder head 2. The large squish area $S_1$ is formed between the second main intake valve 15 and the exhaust valve 18 and has its inward central portion 19 extending generally radially toward the axial center 0 of the cylinder 4.

The second squish area $S_2$ is formed at the peripheral portion of the cylinder 4 between the first and second main intake valves 14 and 15, and the third squish area $S_3$ is also formed at the peripheral portion of the cylinder 4, but between the first main intake valve 14 and the exhaust valve 18.

An auxiliary combustion chamber A is located in the cylinder head 2 above the first squish area $S_1$ and at a position above the main combustion chamber M with a partition wall 26 formed therebetween. An auxiliary intake valve opening 20 communicates with an auxiliary intake port 21 which is formed in the cylinder head 2 and is supplied by a relatively rich air-fuel mixture from an auxiliary carburetor 22. A retainer 23 is provided with a port 24 for connecting the auxiliary combustion chamber A to the auxiliary intake port 21. The auxiliary intake valve 25 slides within the retainer 24 and is opened and closed by conventional valve actuating mechanism. When the auxiliary intake valve 21 is open, a relatively rich air-fuel mixture is introduced through the auxiliary intake port 21 into the auxiliary combustion chamber A.

The auxiliary combustion chamber A has the shape of a cylinder with a hemispherical lower end. The longitudinal axis $l_1$—$l_1$ of the auxiliary combustion chamber A is inclined downward to intersect the longitudinal axis L—L of the cylinder 4. It is to be noted that a part of the auxiliary combustion chamber A is positioned above the inward projecting portion 19 of the first squish area $S_1$.

Below the auxiliary combustion chamber A there is provided a threaded opening 27, which is offset to one side of the chamber A for mounting of a spark plug P. A plug chamber 28 communicates with the bottom portion of the auxiliary combustion chamber A. The spark plug P which is received in the threaded opening 27 has its electrodes 29 positioned in the plug chamber 28 and partially projected into the auxiliary combustion chamber A.

The partition wall in the cylinder head 2 is provided with a torch passage 30 having an upstream end which communicates with the plug chamber 28 and the bottom portion of the auxiliary combustion chamber A. The electrodes 29 are positioned within the projection of the upstream end of the torch passage 30. end of the torch passage 30 opens into the cavity 6 in the cylinder head 2. The upstream end of the torch passage 30 is formed by the cylindrical portion 30a. The taper portion 30b diverges toward the volumetric central portion of the main combustion chamber M. The portions 30a and 30b are coaxial along the line $l_2$—$l_2$ and meet at the juncture 30c. The extension of the longitudinal axis $l_2$—$l_2$ of the torch passage 30 passes between the second main intake valve 15 and the exhaust valve 18, and then passes just below the first main intake valve 14 at a position closer to the second main take valve 15.

A suction conduit 32 having a smaller diameter than the torch passage 30 extends from the first squish area $S_1$ to the juncture 30c between the ends of the torch passage 30. The longitudinal axis $l_3$—$l_3$ of the suction conduit 32 intersects the longitudinal axis $l_2$—$l_2$ of the main torch passage 30. As shown in FIG. 1, the distance a from the upstream end of the torch passage 30 to the electrodes 29 of the spark plug P is less than the distance b from such upstream end of the torch passage 30 to the sealing surface of the auxiliary intake valve 25. The distance a is preferably about 2/5 of the distance b. If desired, more than one suction conduit 32 may extend from the squish area $S_1$ to intersect the torch passage 30.

In the operation of the form of the invention shown in FIGS. 1-6, a relatively lean mixture is drawn into the main combustion chamber M through intake valves 14 and 15 during the suction stroke of the piston 5. During the same suction stroke, a relatively rich mixture is drawn into the auxiliary combustion chamber A through the auxiliary intake valve 25 and into the main combustion chamber M through the torch passage 30. During the following compression stroke the valves 14, 15 and 25 are closed so that the lean mixture and some of the rich mixture are forced back into the auxiliary combustion chamber A. When the spark plug electrodes 29 are energized near the end of the compression stroke, the mixture in the auxiliary combustion chamber A is ignited and a torch flame is projected through the torch passage 30 into the main combustion chamber M to burn the relatively lean air-fuel mixture therein. The following favorable burning effects are obtained:

(I) Burned Gas Torch Effect

The electrodes 29 of the spark plug P are located near the upstream end of the torch passage 30 and on the lower side of the auxiliary combustion chamber A, with the suction conduit 32 extending from the first squish area $S_1$ to intersect the torch passage 30 between its ends. When the spark plug electrodes are energized, the relatively rich air-fuel mixture around its electrodes 29 is first burned, and the burning flame simultaneously propagates toward the interior of the auxiliary combustion chamber A and the torch passage 30. The air-fuel mixtures in the auxiliary combustion chamber A and in the torch passage 30 are burned concurrently to speed up the ignition of the lean air-fuel mixture in the main combustion chamber M, and thereby the difference between the pressures in the main and auxiliary chambers becomes small to decrease the torch flame propagation. In this case, the burning of the mixture is started in the vecinity of the upstream end of the torch passage 30 and therefore the burned mixture around the upstream end of the torch passage 30 is first projected into the main combustion chamber M and then the burning flame in the auxiliary combustion chamber A is projected therein so as to follow the preceding burned mixture. The torch flame is projected from the torch nozzle 30 into the main combustion chamber M and takes the form of a burning gas torch flame including little unburned rich fuel mixture. Consequently, due to the slow propagation of the torch flame and the relatively long duration of torch flame projection (including little unburned rich mixture) into the main combustion chamber, the air-fuel mixture in the main combustion chamber M is ignited and burned without causing any intense turbulence in the mixture. This reduces the occurrence of combustion noises, which are not related to knocking. Combustion of the mixture in the main combustion chamber M rapidly raises the combustion pressure therein and this pressure rapidly propagates toward the squish portions. The flow of burning gas in the torch passage 30 produces an ejector effect to lower the pressure in the suction conduit 32, resulting in that the unburned mixture in the squish portions is sucked and drawn through the suction conduit 32 into the torch passage 30. The mixture is then mixed with the burning gas flowing in the torch passage 30 and is burned to be again projected into the main combustion chamber M as a burned gas. In this combustion process, the maximum combustion pressure and the rate of the pressure rise within the main combustion chamber M are kept at low levels, any local temperature rise of the end gas caused by adiabatic compression is restrained, and therefore, even if the compression ratio is high, such undue rise in combustion pressure and temperature is restrained, so that the knocking phenomenon is effectively restrained. Turbulence of the mixture in the main combustion chamber M as well as combustion noises therefrom are minimized. Furthermore, the aforementioned circulating function of the suction conduit 32 reburns the unburned mixture in the main combustion chamber M so that emission of noxious components are as HC and CO in the exhaust gases can be reduced.

(II) Effects of Shortening the Combustion Time and Cooling the End Gas

These effects are obtained by making the main combustion chamber M in compact form, providing the squish areas around the main combustion chamber M, placing the torch passage to discharge toward the center of the main combustion chamber M, and providing the suction conduit 32 connecting a squish area to the torch passage at a location between its ends. The distance of torch flame propagation through the torch passage is short and thereby the combustion of the lean air-fuel mixture is shortened. The combustion speed of the mixture in the main combustion chamber M is accelerated primarily by the function of the first squish area $S_1$ whereby knocking phenomenon can be restrained and thermal efficiency can be enhanced.

Moreover, with the wall surface portions of the squish areas $S_1$, $S_2$ and $S_3$ being held to a low temperature, together with the squish function of these areas, self-ignition phenomenon of the fuel mixture, otherwise likely to be generated around the main combustion chamber M, is prevented. In addition, because the suction conduit 32 opens to the first squish area $S_1$, the circulation of the unburned mixture into the torch passage 30 is accelerated, which also contributes to the reduction of the knocking phenomenon.

Also, the specific positioning of the intake and exhaust valves, the shape and compact structure of the main combustion chamber M, the position of the torch passage 30, the location of the auxiliary combustion chamber A, the mounting of the spark plug P, and the formation of the squish areas, all contribute to markedly improve the above-mentioned effects (I) and (II) with greater charging effeciency of the engine.

Figure 7:
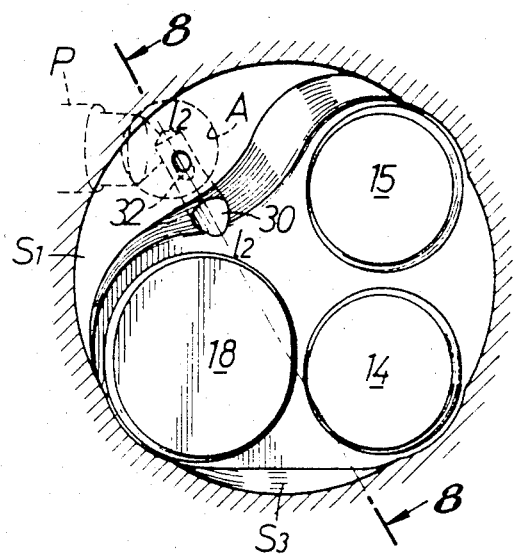
FIG. 7 is a view similar to FIG. 2 showing a modification.
Figure 8:
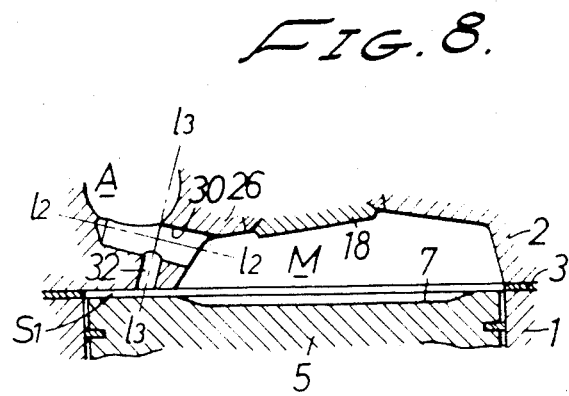
FIG. 8 is a view taken substantially on line 8—8 as shown on FIG. 7.
Figure 9:
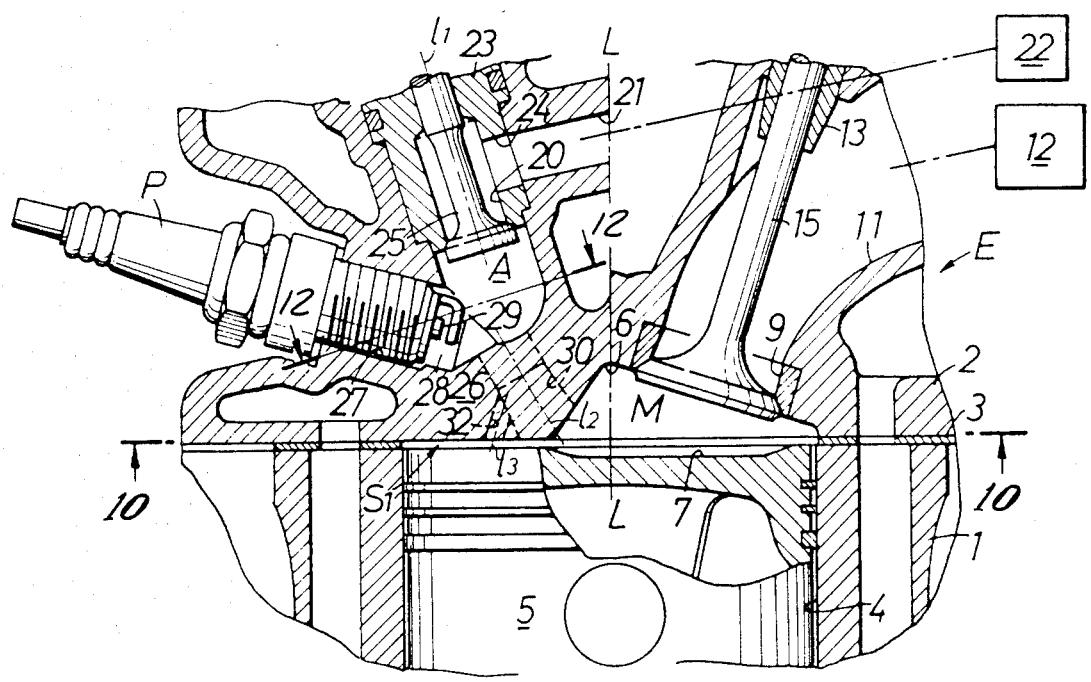
Figure 14:
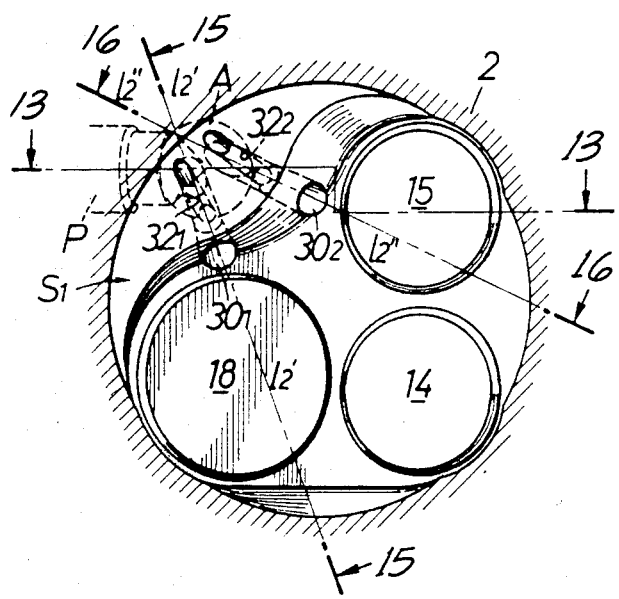

In the modified form of the invention shown in FIGS. 7 and 8, the position of the torch passage 30 and the size of the first squish area $S_1$ are different from that previously described. The downstream end of the torch passage 30 is at a position offset to the exhaust valve 18. Also, the longitudinal axis $l_2$—$l_2$ of the torch passage 30 is directed to the center of the main combustion chamber M, the extension of which axis passes immediately below those peripheral portions of the exhaust valve 18 and the first main intake valve 14 which are adjacent to each other. The first squish area $S_1$ is formed smaller than that of the embodiment previously described. This second embodiment of FIGS. 7 and 8 retains the functions and merits of those described in the preferred embodiment of FIGS. 1-6.

FIGS. 9-12 show a third embodiment which differs somewhat from the first embodiment in the disposition of the torch passage 30 and the size of the first squish area $S_1$. The upstream end of the torch passage 30 opens to both the auxiliary combustion chamber A and the adjacent plug chamber 28, whereas the downstream end of the torch passage 30 is positioned offset to the exhaust valve 18 in a manner similar to that shown in the second embodiment. The longitudinal axis $l_2$—$l_2$ of the torch passage 30 is directed to the central portion of the main combustion chamber M and its extension passes just below the peripheral portions of the exhaust valve 18 and the first main intake valve 14. The first squish area $S_1$ is made smaller than that of the first embodiment. The functions and operation of this third embodiment are similar to those of the first embodiment.

Figure 15:
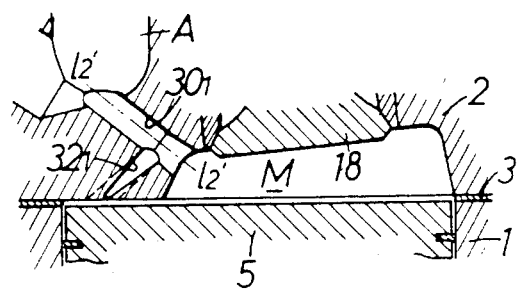
Figure 16:
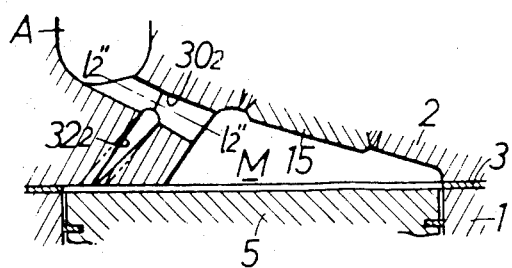
Figure 17:
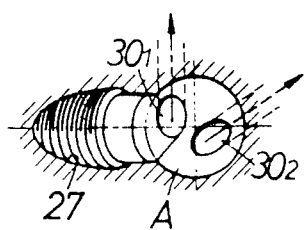

A fourth embodiment of the present invention as shown in FIGS. 13–17 has two torch passages $30_1$ and $30_2$. The upstream end of the torch passage $30_1$ opens to both the auxiliary combustion chamber A and plug chamber, as shown in FIG. 15, while its downstream end opens at a upper portion of the side wall of the main combustion chamber M in the neighborhood of exhaust valve 18. The extension of the longitudinal axis $l'_2$—$l'_2$ of the first torch passage $30_1$ passes below the exhaust valve 18. The upstream end of the second torch passage $30_2$ communicates with the bottom surface of the auxiliary combustion chamber A, and as shown in FIG. 16, its downstream end opens at an upper portion of the side wall of the main combustion chamber M. The extension of the longitudinal axis $l''_2$—$l''_2$ of this second torch passage $30_2$ passes immediately below the second main intake valve 15.

The first and second suction conduits $32_1$ and $32_2$ intersect the torch passages $30_1$ and $30_2$, respectively, and both are open to the first squish area $S_1$, leaving a space between them. In this fourth embodiment of the invention, the upper face of the piston 5 is not provided with a recess portion and instead is formed substantially flat. Consequently, the second and third squish areas $S_2$ and $S_3$, as employed in the first embodiment, are not present.

The main combustion chamber M of this embodiment is formed smaller in volume than those of the foregoing embodiments previously described. In this embodiment of FIGS. 13–17, torch flames are projected from the two torch passages $30_1$ and $30_2$ toward the lower portions of the exhaust valve 18 and the second main intake valve 15 for uniform and quick burning of the mixture in the main combustion chamber M. The flame propagation distance is short, thus realizing further shortening of combustion time, which is a beneficial factor for restraining the phenomenon of knocking. Further, the provision of the suction conduits $32_1$ and $32_2$ establish that the temperature and pressure of the fuel mixture can be reduced as in the case of the first embodiment, and these are other factors contributing to restraining the knocking phenomenon.

It is to be noted that in this fourth embodiment the electrodes 29 of the spark plug P are outside the projection of the upstream ends of the torch passages $30_1$ and $30_2$ so that the flame kernel generated around the electrodes 29 is not blown out by the compressed lean mixture flowing from the main combustion chamber M into the torch passages $30_1$ and $30_2$ near the end of the compression stroke of the engine. It will be understood that more than one suction conduit may intersect each of the torch passages $30_1$ and $30_2$.

A fifth embodiment of the invention shown in FIGS. 18–24 is a modified form of the fourth embodiment and differs from the latter in the directions of the first and second torch passages $30_1$ and $30_2$ and the suction conduits $32_1$, $32_2$, and the size of the first squish area $S_1$. Namely, both ends of the first and second torch passages $30_1$, $30_2$, are spaced from each other and the crossed angle of the longitudinal axes $l'_2$—$l'_2$ and $l''_2$—$l''_2$ of the two torch passages $30_1$ and $30_2$ is relatively small. Furtner, the upstream ends of the torch passages $30_1$ and $30_2$ are positioned away from each other with respect to the electrodes 29 of the spark plug P. The torch passage $30_1$ opens to both the auxiliary combustion chamber A and the plug chamber 28 while the second torch passage $30_2$ opens to the bottom portion of the auxiliary combustion chamber A. The first squish area $S_1$ is relatively small, and the second and third squish areas (corresponding to $S_2$ and $S_3$) are not provided in this embodiment. Additionally, since the piston 5 has at its upper face a large diameter recessed portion 7', as shown in FIGS. 28 and 29, the area of the first squish area $S_1$ is relatively small. This form of the invention operates in substantially the same fashion as that described in connection with the fourth embodiment.

FIGS. 25–27 show a sixth embodiment, which is a modified form of the fifth embodiment. The distances from the electrodes 29 of the spark plug P to the upstream ends of the first and second torch passages $30_1$ and $30_2$ are substantially equal to each other.

In accordance with the present invention, as has been described in detail with reference to the first to sixth embodiments, there is provided a torch ignition type internal combustion engine which has a specifically constructed main combustion chamber, auxiliary combustion chamber, torch passage, and suction passage in which the elements correlate with one another to improve the purification of exhaust gas and the specific fuel consumption, thereby providing an increase in engine power output and removing noises associated with the combustion process.

Having fully described our invention, it is to be understood that we are not to be limited to the details herein set forth but that our invention is of the full scope of the appended claims.

We claim:

1. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, the piston and the cylinder head cooperating to form a squish area, a cavity in the cylinder head and a recess in the top face of the piston cooperating to form a compact portion of the main combustion chamber adjacent said squish area, two main intake valves on one side of said cavity for supplying said compact portion of the main combustion chamber with an air-fuel mixture, an exhaust valve on the other side of said cavity adjacent one of said main intake valves, the torch passage communicating with said cavity between said exhaust valve and the other of said main intake valves, a spark plug having electrodes communicating with said auxiliary combustion chamber and with the upstream, end of said torch passage, and suction conduit mean intersecting the torch passage between its ends and extending only from said squish area of the main combustion chamber to said passage whereby movement of burning air-fuel mixture through the torch passage and pressure from said squish area causes a flow of air-fuel mixture from said squish area through said suction conduit means and into the torch passage.

2. The combination set forth in claim 1 in which said two main intake valves supply a relatively lean air-fuel mixture to said main combustion chamber, and in which means are provided to supply said auxiliary combustion chamber with a relatively rich air-fuel mixture.

3. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, the piston and the cylinder head cooperating to form a plurality of squish areas, a first being larger than the others, a cavity in the cylinder head and a recess in the top face of the piston cooperating to form a compact portion of the main combustion chamber radially inward of said squish areas, two main intake valves on one side of said cavity for supplying said compact portion of the main combustion chamber with an air-fuel mixture, an exhaust valve on the other side of said cavity adjacent one of said main intake valves, the torch passage communicating with said cavity between said exhaust valve and the other of said main intake valves, a spark plug having electrodes communicating with said auxiliary combustion chamber and with the upstream end of said torch passage, and at least one suction conduit intersecting the torch passage between its ends and extending from said first squish area of the main combustion chamber, whereby movement of burning air-fuel mixture through the torch passage and pressure from said first squish area causes a flow of air-fuel mixture from said first squish area through said suction conduit and into the torch passage.

4. In an internal combustion engine having a piston slidably mounted in a cylinder and cooperating with a cylinder head to form a main combustion chamber, the combination of: an auxiliary combustion chamber provided in the cylinder head and connected by torch passages to the main combustion chamber, the piston and the cylinder head cooperating to form a squish area, a cavity in the cylinder head and a recess in the top face of the piston cooperating to form a compact portion of the main combustion chamber adjacent said squish area, two main intake valves on one side of said cavity for supplying said compact portion of the main combustion chamber with an air-fuel mixture, an exhaust valve on the other side of said cavity adjacent one of said main intake valves, one torch passage communicating with said cavity between said exhaust value and the other said main intake valves, and another torch passage communicating with said cavity near said exhaust valve, a spark plug having electrodes communicating with said auxiliary combustion chamber and with the upstream ends of said torch passages, and suction conduit means intersecting each torch passage between its ends and extending only from said squish area of the main combustion chamber to a respective torch passage, whereby movement of burning air-fuel mixture through the torch passages and pressure from said squish area causes a flow of air-fuel mixture from said squish area through said suction conduit means and into the torch passages.

5. The combination set forth in claim 4 in which two torch passages diverge from the lower portion of the auxiliary combustion chamber.

6. In an internal combustion engine having a piston slidably mounted in a cylinder and cooperating with a cylinder head to form a main combustion chamber, the combination of: an auxiliary combustion chamber provided in the cylinder head, the piston and the cylinder head cooperating to form a squish area, a cavity in the cylinder head and a recess in the top face of the piston cooperating to form a compact portion of the main combustion chamber adjacent said squish area, two intake valves on one side of said cavity for supplying said compact portion of said main combustion chamber with a relatively lean air-fuel mixture, an exhaust valve on the other side of said cavity to carry exhaust gases from said compact portion, means for supplying said auxiliary combustion chamber with a relatively rich air-fuel mixture, a plurality of torch passages communicating with said auxiliary combustion chamber and said cavity, the axis of one of said torch passages passing between the exhaust value and the other of the main intake valves, and the axis of the other torch passage passing near one of said intake valves, a spark plug having electrodes communicating with said auxiliary combustion chamber and with the upstream ends of said torch passages, and suction conduit means intersecting each torch passage between its ends and extending only from said squish area of the main combustion chamber to a respective torch passage, whereby movement of burning air-fuel mixture through the torch passages and pressure from said squish area causes a flow of air-fuel mixture from the main combustion chamber through said suction conduit means and into the torch passages.

7. In an internal combustion engine having a piston slidably mounted in a cylinder and cooperating with a cylinder head to form a main combustion chamber, the combination of: an auxiliary combustion chamber provided in the cylinder head, the piston and the cylinder head cooperating to form a squish area, a cavity in the cylinder head and a recess in the top face of the piston cooperating to form a compact portion of the main combustion chamber adjacent said squish area, intake valve means for supplying said compact portion of said main combustion chamber with an air-fuel mixture, auxiliary intake valve means for supplying said auxiliary chamber with an air-fuel mixture, exhaust valve means for carrying exhaust gases from said compact portion, two torch passages each communicating with said cavity, walls in said cylinder head forming a plug chamber communicating with the upstream end of one of said torch passages, the upstream end of the other of the torch passages communicating with said auxiliary combustion chamber, a spark plug having electrodes in said plug chamber, and suction conduit means intersecting each torch passage between its ends and extending only from said squish area of the main combustion chamber to a respective torch passage, whereby movement of burning air-fuel mixture through the torch passages and pressure from said squish area causes a flow of air-fuel mixture from the main combustion chamber through said suction conduit means and into the torch passages.

8. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, the piston and the cylinder head cooperating to form a squish area, means including a cavity in the cylinder head forming a compact portion of the main combustion chamber adjacent said squish area, two main intake valves on one side of said cavity for supplying said compact portion of the main combustion chamber with an air-fuel mixture, an exhaust valve on the other side of said cavity adjacent one of said main intake valves, the torch passage communicating with said cavity between said exhaust valve and the other of said main intake valves, a spark plug having electrodes communicating with said auxiliary combustion chamber and with the upstream end of said torch passage, and conduit means intersecting the torch passage between its ends and extending only from said squish area of the main combustion chamber to said torch passage.

9. In an internal combustion engine having a piston slidably mounted in a cylinder and cooperating with a cylinder head to form a main combustion chamber, the combination of: an auxiliary combustion chamber provided in the cylinder head and connected by a torch passage to the main combustion chamber, the piston and the cylinder head cooperating to form a plurality of squish areas, a first being larger than the others, a cavity in the cylinder head and a recess in the top face of the piston cooperating to form a compact portion of the main combustion chamber radially inward of said squish areas, two main intake valves on one side of said cavity for supplying said compact portion of the main combustion chamber with an air-fuel mixture, an exhaust valve on the other side of said cavity adjacent one of said main intake valves, the torch passage communicating with said cavity between said exhaust valve and the other of said main intake valves, a spark plug having electrodes communicating with said auxiliary combustion chamber and with the upstream end of said torch passage, and at least one conduit intersecting the torch passage between its ends and extending from said first squish area of the main combustion chamber, whereby movement of burning air-fuel mixture through the torch passage and pressure from said first squish area causes a flow of air-fuel mixture from said first squish area through said conduit and into the torch passage.

* * * * *

UNITED STATES PATENT AND TRADEMARK OFFICE
CERTIFICATE OF CORRECTION

PATENT NO. : 4,491,104
DATED : January 1, 1985
INVENTOR(S) : Isao Fujii, Hiroyuki Nishimura & Masaaki Kato It is certified that error appears in the above—identified patent and that said Letters Patent is hereby corrected as shown below:

Column 6, line 49, correct the spelling of "efficiency".
Column 8, line 6, correct the spelling of "Further".
Column 8, line 62, remove the comma between the word "upstream" and "end".
Column 8, line 65 insert the word "torch" between the words "said" and "passage".

Signed and Sealed this

Ninth Day of July 1985

[SEAL]

Attest:

DONALD J. QUIGG

Attesting Officer   Acting Commissioner of Patents and Trademarks